United States Patent [19]

Delwel

[11] Patent Number: 5,286,470
[45] Date of Patent: Feb. 15, 1994

[54] SILICATE PRODUCTS

[75] Inventor: Francois Delwel, Dordrecht, Netherlands

[73] Assignee: Unilever Patent Holdings B.V., Rotterdam, Netherlands

[21] Appl. No.: 775,930

[22] PCT Filed: Feb. 27, 1991

[86] PCT No.: PCT/GB91/00300
§ 371 Date: Dec. 31, 1991
§ 102(e) Date: Dec. 31, 1991

[87] PCT Pub. No.: WO91/13026
PCT Pub. Date: Sep. 5, 1991

[30] Foreign Application Priority Data

Mar. 1, 1990 [GB] United Kingdom ............ 9004563.4

[51] Int. Cl.$^5$ .................................... C01B 33/32
[52] U.S. Cl. ..................... 423/332; 252/135; 23/293 R
[58] Field of Search ............... 423/326, 332; 23/313 FB, 313 AS, 293 R; 252/135; 264/117, 118

[56] References Cited

U.S. PATENT DOCUMENTS

| 3,687,640 | 8/1972 | Sams et al. | 23/313 AS |
| 3,782,906 | 1/1974 | Pierce | 23/313 AS |
| 3,868,227 | 2/1975 | Gericke et al. | 23/313 AS |
| 3,875,282 | 4/1973 | Steinreich | 264/118 |
| 3,918,921 | 11/1975 | Pierce | 23/313 AS |
| 3,931,036 | 1/1976 | Pierce | 252/135 |
| 4,126,423 | 11/1978 | Kongsgaarden | 23/313 AS |
| 4,834,902 | 5/1989 | Pioch et al. | 23/313 AS |

FOREIGN PATENT DOCUMENTS 2360502 6/1975 Fed. Rep. of Germany .
2227224 11/1974 France .

Primary Examiner—R. Bruce Breneman
Attorney, Agent, or Firm—Cushman, Darby & Cushman

[57] ABSTRACT

The characteristics of compacted sodium silicate, in particular the attrition resistance, are improved by contacting the material with water in an agitated bed. A preferred route for adding moisture is the use of steam which gives efficient distribution in the bed.

8 Claims, No Drawings

SILICATE PRODUCTS

FIELD OF THE INVENTION

This invention relates to solid silicate products intended for use in particulate detergent compositions. These silicate products act as a source of alkalinity for the detergent powder when in use. Thus, in common with the other components of the detergent composition, the silicate product is required to have acceptable water solubility, be non-caking and not provide fines by attrition when subjected to handling or while in the detergent powder.

BACKGROUND OF THE INVENTION

Detergent compositions intended for mechanical dishwashing will usually require a component capable of providing a considerable alkalinity in the wash liquor. Sodium silicates having a $SiO_2/Na_2O$ mole ratio from about 1.5:1, preferably from 1.8:1 to about 3.3:1, preferably to 2.2:1 are particularly suitable for this purpose and also they protect glassware from corrosion. There is a general movement towards providing detergent compositions with increased bulk densities i.e. above about 700 g/l, preferably above 800 g/l. Sodium silicates within the mole ratio 1.8 to 2.2:1 range will be referred to herein as sodium disilicates, although strictly this term is applicable only to those silicates having a mole ratio of about 2:1. Disilicates and other silicates can be formed into a product of the desired bulk density by compacting the appropriate feedstock, which may be spray-dried material, between rollers to provide a compacted sheet-like product which is subsequently broken up and sieved to provide the desired particle size range. Examples of procedures which provide these compacted materials will be found in US 3875282 (Stauffer Chemical Co.) and US 3931036 (Philadelphia Quartz Co.).

GENERAL DESCRIPTION OF THE INVENTION

The sodium disilicate or other silicate product obtained by compaction displays the desired bulk density but demonstrates a relatively high loss of material as fines by virtue of the attrition the product undergoes when handled and incorporated in the product. A particular source of attrition comes from the pneumatic handling devices commonly used in transporting the raw materials before preparing the detergent composition by mixing the desired ingredients. The particle size of the desired silicate granules will preferably be in the range 0.4 to about 0.75 mm, but the process of the invention is applicable to materials having particle sizes in the range 0.3 to 2 mm.

The applicants have found that the attrition of compacted sodium silicate can be reduced by treating the compacted silicate with added moisture preferably at elevated temperatures, i.e. above 80° C., in an agitated bed. Usually the moisture treatment will be achieved by introducing steam into the vessel containing the agitated bed. The use of steam to introduce the added water is preferred because better distribution is provided The device in which the silicate is treated may be, as examples, a rotating drum, cement mixer, Eirich-type open pan, or Lödige mixer. The agitated bed can be formed in free fall/tumbling mixer, fluidised bed or paddle mixer as examples. These provide a rapid renewal of exposed surfaces and application of shear to round off the particle edges.

The moisture as liquid water or water vapour, e.g. steam, will be applied at a rate and for a time to ensure the moisture content of the disilicate is not increased by more than about 1% by weight. Increasing the water content by more than this amount may lead to caking of the product in the absence of an additional drying step.

The treated product may be cooled in an air stream or other cooling gas.

The invention provides a method of treating compacted sodium silicate granules, having a molar ratio $SiO_2/Na_2O$ of from about 1.5:1, preferably from about 1.8:1, to about 3.3:1, preferably to about 2.2:1, and an average particle size in the range from about 0.3 mm to about 2 mm, wherein the granules are contacted with moisture preferably at elevated temperatures above 80° C. in an agitated bed. Preferably the particles are contacted with steam as a convenient form of obtaining contact with moisture at an elevated temperature. Appropriate vessels in which the agitated bed can be prepared are an open rotating dish or a cylindrical vessel rotatable about the cylindrical axis. The dish or vessel must be operated so that tumbling is provided within the bed. The heat applied to the agitated bed is obtained preferably only from the moisture introduced as steam.

Product has particularly good properties of low attrition in pneumatic transport systems. Thus a compacted feedstock will have its attrition reduced by 2 or 3 times using the process of the invention.

Classes of detergent formulations of higher bulk densities, i.e.. above 700 g/l, are those formulations intended for use in mechanical dishwashers and in fabric washing. The bulk densities can be considerably above the level quoted but usually they will not exceed 1000 g/l. The preparation of detergent powders having relatively high bulk density is described in a number of patent specifications. Thus EPA 0367339 (Unilever) describes a two step procedure utilising in sequence a high speed mixer densifier and a moderate speed granulator densifier. The process described utilises a particular starting material. In EPA 0220024 (Procter & Gamble) a process is described utilising a spray dried detergent powder as feedstock which is subjected to compaction using a roll compacter. In general the detergent formulations to which the present invention is applicable will contain from about 0.1% to about 40% by weight of surfactant, from about 10% to about 70% by weight, preferably 25% to 50% by weight of detergency builder.

Additionally the detergent formulations may contain polymeric materials to stabilise ingredients or give beneficial results during the washing procedure, e.g. suspension of soil. Furthermore they can promote dispersion of components present in the wash liquor i.e. fluorescers, germicides and, in particular, silicate components. In addition to providing a degree of alkalinity in the wash liquor the silicate components also act to reduce corrosion in washing machines and protect glass against the effects of high alkalinity in dishwashing.

In general there is no restriction on the detergent active material or detergency builders which may be utilised in the present invention. Thus the detergent actives, also termed surfactants, may be selected from anionic, nonionic, ampholytic, zwitterionic materials or mixtures thereof The anionic and nonionic surfactants can be utilised alone or as mixtures. Examples of suitable surfactants are water soluble alkaline metal salts of organic sulphates and sulphonates having C8 to C22 alkyl radicals Alkyl sulphates may be obtained by sulphating higher, C8 to C18, alcohols obtained from natural sources e.g. tallow or coconut oil. Sodium and potassium alkyl (C9 to C20) benzene sulphonates, and specially sodium linear secondary alkyl (C10 to C15) benzene sulphonates, are preferred surfactants. Suitable nonionic surfactants include the reaction products of compounds having a hydrophobic group and a reactive hydrogen atom, e.g. aliphatic alcohols, acids, amides or alkyl phenols with alkylene oxides, especially ethylene oxide alone or with propylene oxide.

Test Methods

Bulk density: A cylinder (height/diameter ratio of approximately 2) is filled with powder to a measured volume and the sample weighed.

Ball mill friability (BMF): This measures the breakdown of granules under conditions representing high shear mixing.

The sample of granulate is sieved to remove oversize (>1250 μm) and undersize (<125 μm) and then split into two parts. One part is used to measure the size distribution by sieving. The other part is put in the ball mill.

The ball mill is a 10×10 cm cylinder, containing 50 porcelain balls of 1 cm diameter and operated at 90 rpm, while set at a declination of 16 degrees. After 5 minutes milling the sample is removed and sieved to determine the size distribution. Ball mill friability is expressed as the percentage increase in fines <125 μm.

Particle size: Measured using standard sieves.

Insolubles: The dried residue in % after dissolving the material to form a 1% solution in water at 20° C., under standardised stirring conditions. The residue determined using a 7 μm Millipore filter and 2 hours dying at 80° C.

Moisture content: The loss in weight on 1 hour drying at 900° C.

Particle size distribution: Average particle size and size distribution are determined by sieving, using a standard set of sieves, and expressed as the Rosin Rammler values Dm (μm) and N respectively. This is a well known method of describing granulometries.

SPECIFIC DESCRIPTION OF THE INVENTION

Examples of the invention will now be given to illustrate but not limit the method of treating compacted silicate.

EXAMPLE I

A standard cement mixer, capacity 50 liters, was used as the tilted rotating drum for this example. Sodium disilicate with a $SiO_2:Na_2O$ ratio of 2:1, 5 kg, compacted between rollers, using a spray-dried feedstock, was used as the feedstock for this example. Steam was applied for from zero (reference) minutes to 4 minutes and the characteristics of the treated product measured. The products were cooled in air before the properties were measured. The results are given in Table I.

TABLE I

| Time of Steam Appl. | Moisture (%) | Caking* (%) | Fines** (%) | Insol. (%) |
|---|---|---|---|---|
| 0 | 18.6 | 0 | 9.4 | 14.3 |
| 1 | 19.1 | 1 | 6.4 | 6.0 |
| 1.5 | 19.5 | 1 | 3.5 | 7.1 |
| 2 | 20 | 1 | 4.2 | 3.7 |
| 3 | 20.2 | 1 | 2.5 | 8.4 |
| 4 | 21.8 | 4 | 2.6 | 2.9 |

*Caking was assessed visually on a scale of 0 (good) to 5 (poor).
** <180 μm formed in pneumatic transport.

These results demonstrate the steam treatment improves the properties of the compacted disilicates, i.e. reduces the attrition in pneumatic transport and reduces the insolubles. The caking of the 4 minute product (3.2 % added moisture) is reduced by subjecting the steam treated product to a drying step while tumbling in the drum.

EXAMPLE II

A Lödige recycler drum capacity 50 liters, was used as the treatment vessel. Compacted sodium disilicate (ratio 2:1) with a bulk density 800 g/l was dosed to the drum at 700 Kg/hr. The shaft rotational speed and rate of steam injection were varied with the latter not being increased beyond the point at which caking occurred. The treated granulate was then belt transported to a fluidised bed for cooling and subsequently for collection in 500 Kg capacity bags. Samples of the disilicate were taken before and after the recycler.

The feedstock used was compacted disilicate obtained from Crosfield Chemicals Eijsden Netherlands. This had a particle size range of 0.2 mm to 1.2 mm, a water content of 19.3%, a ball mill friability (BMF) of 0.8% below 125 micron and a fines formation in pneumatic transport of 11% below 180 micron.

The Lödige Mixer was initially used with a shaft rotation of 600 rpm subsequently increased to 1800 rpm. The steam supply was initially fully open and was subsequently decreased step wise. The experimental characteristics and product results are given in Table II.

EXAMPLE III

In this example a rotating drum was used as the steam treatment vessel. A flexi-drum having a length of 1.8 meters and a diameter of 0.65 metres included a flexible wall of PVC without baffles. The flexible wall prevents build up by distorting as the drum rotates The drum was rotated at 19 rpm and contained an end rim 0.1 meters high. The angle of declination was varied during the process in order to study the variation in end product properties as the hold-up/residence time in the drum were changed. Steam was introduced through a pipe running centrally into the drum provided with three nozzles each having a 8 mm diameter opening. The feedstock was the same material as used for the Lödiger recycler. The results are given in Table II.

TABLE II

| Process | | | DM | N | Fines (%) | Oversize (%) | BMF (%) | Drying loss (%) | Fines** (%) |
|---|---|---|---|---|---|---|---|---|---|
| Feedstock Recycler (Ex II) | | | 888 | 3.2 | 1.1 | 26 | 0.79 | 19.3 | 11.2 |
| rpm | steam | time | | | | | | | |
| 600 | open | 2 | 875 | 3.2 | 0.8 | 24.6 | 0.15 | 20.27 | 3.5 |
| 1000 | less open | 4 | 874 | 3.1 | 1.1 | 24.1 | 0.14 | 20.08 | 4.5 |

TABLE II-continued

| Process | | | DM | N | Fines (%) | Oversize (%) | BMF (%) | Drying loss (%) | Fines** (%) |
|---|---|---|---|---|---|---|---|---|---|
| 1000 | less open | 8 | 847 | 2.5 | 3.9 | 21.3 | 0.16 | 20.44 | 3.9 |
| 1000 | more open | 16 | 883 | 2.8 | 2.2 | 24.1 | 0.28 | 19.62 | 6.5 |
| 1800 | more open | 26 | 739 | 1.9 | 9.0 | 14.0 | 0.30 | 19.70 | 5.3 |
| Drum (Ex III) incl steam time | | | | | | | | | |
| 7% | open | 5 | 891 | 3.2 | 0.2 | 27.3 | 0.12 | 20.78 | 2.4 |
| 7% | less open | 15 | 905 | 3.4 | 0.1 | 28.7 | 0.14 | 20.30 | 3.8 |
| 7% | less open | 20 | 949 | 3.3 | 0.5 | 32.1 | 0.07 | 20.23 | 6.2 |
| 3% | less open | 25 | 917 | 3.4 | 0.3 | 29.2 | 0.17 | 20.28 | 4.9 |
| 3% | less open | 35 | 876 | 2.8 | 1.1 | 25.5 | 0.24 | 20.04 | 7.5 |

**<180 μm formed by passage through pneumatic transport.

It is seen the attrition characteristics of the product in both examples as shown by BMF and pneumatic transport have been improved. The other characteristics have been retained as suitable for use in detergent formulations except for the fines formed in the recycler (Ex II) which leads to the rotating drum (Ex III) being preferred.

EXAMPLE IV

Compacted sodium disilicate (sample A) had a particle size range 200-1600 micron, about 800 micron average. It gave 18% fines (below 180 micron) when subjected to a pneumatic transport system attrition. Sample B was rolled in a tilted rotating dish of 40 cm diameter for 10 minutes to provide a reference. Samples C and D were also rolled for 10 minutes at ambient, i.e. about 25° C., with 1% wt and 2% wt water added over the period of stirring. Samples B, C and D were also subjected to attrition in a pneumatic transport system. The results are given in Table III.

TABLE III

| Sample | % Fines | Caking |
|---|---|---|
| A | 18 | none |
| B | 18.4 | none |
| C | 9 | soft caking |
| D | 6 | caking |

It is seen that water addition improved the resistance to pneumatic transport.

I claim:

1. A method of treating compacted sodium silicate granules, having a mole ratio $SiO_2/Na_2O$ of from about 1.5 to about 3.3:1 and an average particle size in the range from about 0.3 mm to about 2 mm, which comprises contacting the compacted granules with moisture in an agitated bed while avoiding caking of said granules but to thereby minimize the formation of fines by attrition when said compacted granules are subsequently handled.

2. A method according to claim 1 wherein the mole ratio is from about 1.8 to about 2.2:1.

3. A method according to claim 1 or 2 wherein the granules are contacted with moisture at elevated temperatures above 80° C.

4. A method according to claim 1, wherein the particles are contacted with steam.

5. A method according to claim 1 wherein the agitated bed is formed in a rotating cylindrical vessel rotatable about the cylindrical axis or in a tilted rotating dish.

6. A method according to claim 3 wherein the heat applied to the bed is obtained only from the moisture.

7. A detergent composition including the silicate granules of claim 1.

8. In a method of preparing compacted sodium silicate granules by compacting sodium silicate feedstock into a compacted sheet of the desired density and breaking up the sheet into granules having a mole ratio $SiO_2/Na_2O$ of from about 1.5 to about 3.3:1 and an average particle size in the range from about 0.3 mm to about 2 mm, suitable for use in a detergent composition, the improvement which comprises contacting the compacted granules with steam in an agitated bed while avoiding caking of the granules and then drying and cooling said granules while they are agitated, the steam being applied to the compacted granules at a rate and for a time such that the moisture content of the silicate does not exceed more than about 1% by weight, said improvement reducing the amount of fines formed in subsequent handling of said granules.

* * * * *